Figure 1:
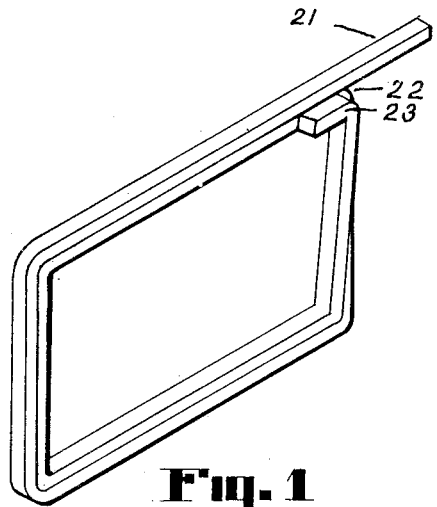
Figure 2:
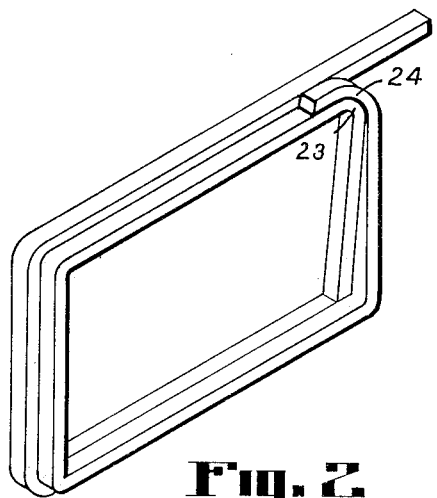
Figures 3, 4:
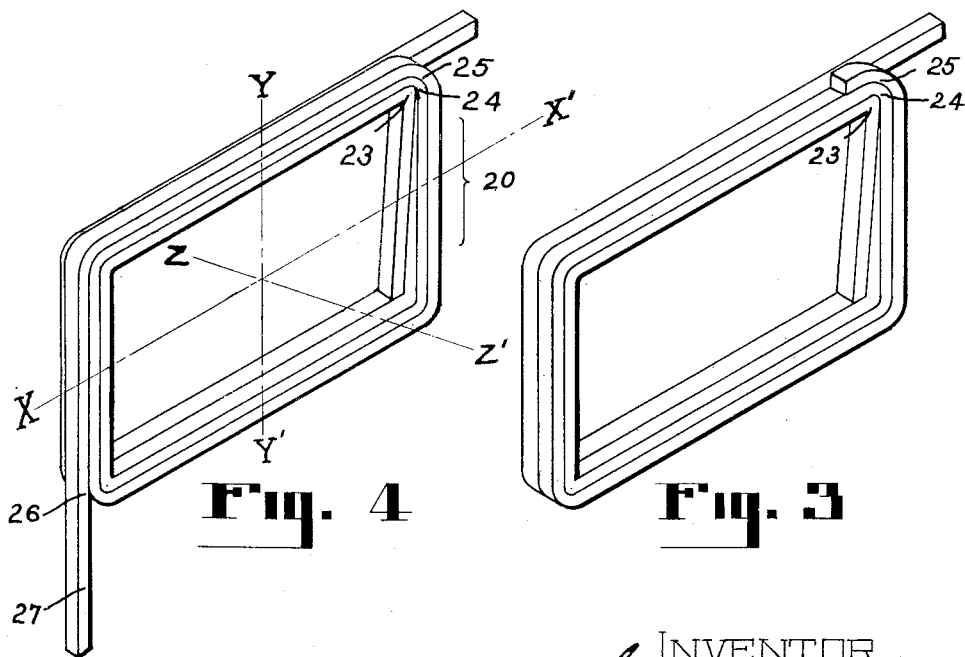

Apr. 10, 1923.

S. ROGERS 1,451,374

CONSTRUCTION OF ELECTRICAL WINDINGS

Filed Aug. 15, 1919   3 sheets-sheet 1

WITNESSES
E. Richard Noe
Walter A. Ruden

INVENTOR
Samuel Rogers
Kerr, Page, Cooper & Hayward
ATTORNEYS

Apr. 10, 1923.
S. ROGERS
CONSTRUCTION OF ELECTRICAL WINDINGS
Filed Aug. 15, 1919
1,451,374
3 sheets-sheet 2
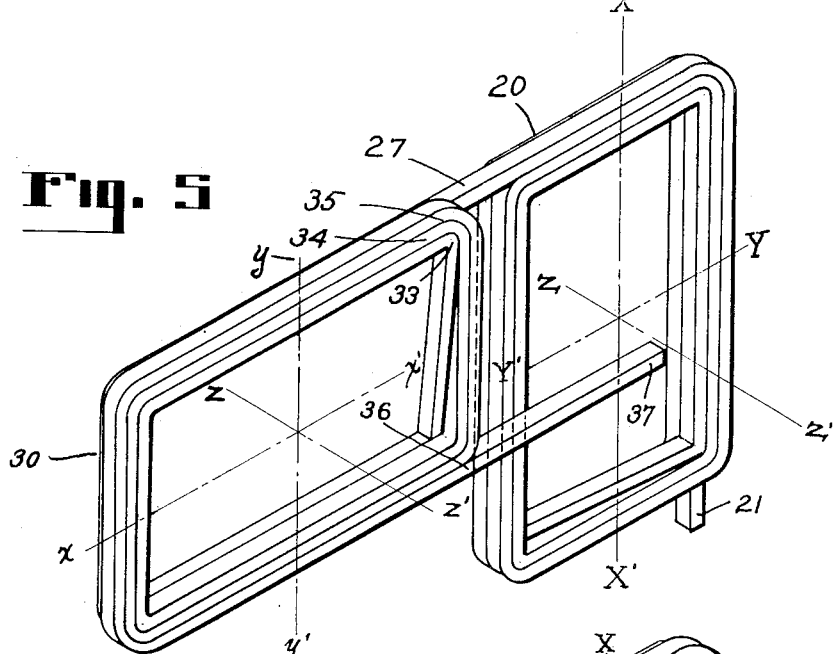
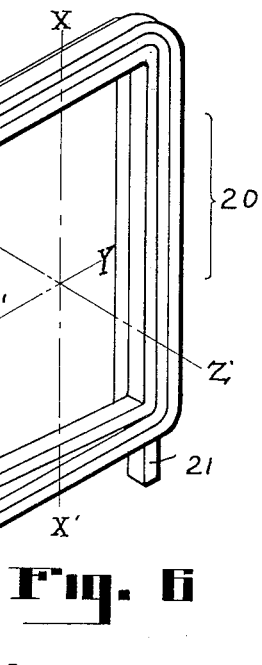
WITNESSES
INVENTOR
Samuel Rogers
Page, Cooper & Hayward
ATTORNEYS Patented Apr. 10, 1923.

1,451,374

UNITED STATES PATENT OFFICE.

SAMUEL ROGERS, OF ANDERSON, INDIANA, ASSIGNOR TO THE REMY ELECTRIC COMPANY, A CORPORATION OF INDIANA.

CONSTRUCTION OF ELECTRICAL WINDINGS.

Application filed August 15, 1919. Serial No. 317,740.

*To all whom it may concern:*

Be it known that I, SAMUEL ROGERS, a citizen of the United States of America, residing at Anderson, county of Madison, State of Indiana, have invented certain new and useful Improvements in Construction of Electrical Windings, of which the following is a full, clear, and exact description.

This invention relates to the construction of electrical apparatus such as includes a plurality of windings for producing magnetic effects, and particularly to the construction of field windings for dynamo-electric-machines.

The chief object of this invention is to construct a group of coils in such a manner that they may be assembled in position upon the electrical apparatus in the simplest manner possible, and so that they will occupy the least possible amount of space. In carrying out this aim of the invention it is an object of the invention to construct a group of coils from a continuous length of conducting material in such a manner that adjacent coils will be connected together, and that the extremities of the coils will extend from the exterior thereof instead of from the innermost turn of the coils. By constructing a coil group in this manner it is not necessary to connect adjacent coils together after they have been formed, and no additional space beyond that required for the coil itself is necessary for bringing out the extremities of the coil group, as would be required where the extremities are brought out from the innermost turn of the coils of the coil group.

In addition to the construction of a coil group in the manner referred to, it is a further object of the invention to construct the coil group in such a manner that the turns of adjacent coils will traverse in opposite directions so that the coils of the group will be arranged in such a way as to produce alternately opposite electromagnetic effects.

Other and further objects of the invention will be apparent from the following description, reference being had to the accompanying drawings, wherein two preferred forms of embodiments are clearly shown.

In the drawings:

Figs. 1 to 6 inclusive are perspective views showing progressive steps of construction of the coil group embodied in the present invention:

Figs. 7 to 10 inclusive are perspective views showing progressive steps of construction of a modified form of the invention.

Referring to Figs. 1 to 6 inclusive of the drawings, 20 designates as a whole the first of a coil group. 21 designates the end of a conducting strip or wire having a rectangular cross-section. This end may be held in fixed position in any suitable manner. The wire is bent around as shown in Fig. 1 to form the first turn of coil 20, said first turn terminating at 22. The second turn is then formed around the inside of the first turn and terminates at 23 at a point alongside the beginning of the second turn. The third turn of coil 20 continues from the point 23 in parallel relation to the second turn, and the end 24 of this third turn overlaps the end 23 of the second turn. The wire is then wound along the exterior of the third turn to complete the fourth turn which ends at 25. The wire is then wound along the exterior of the fourth turn to form a half-turn which terminates substantially at the point 26.

These operations complete the first coil 20 of the group. The coil 20 is substantially rectangular in shape, and for purposes of comparison this coil may be said to have a major axis XX' and minor axis YY' lying in the plane of the coil, and an axis ZZ' perpendicular to said plane about which the winding of the coil may be said to take place.

The terminal 27 of the first coil 20 is brought out from the exterior of the said coil 20 to form the beginning of a second coil 30, having its successive turns formed about an axis $zz'$ parallel to the axis ZZ' and having its successive turns formed with respect to one another in the same manner as the turns of the coil 20. The end of the first turn of the coil 30 is hidden from view, but the end of the second turn is indicated by numeral 33, and the end of the third turn by numeral 34, the end of the fourth turn by the numeral 35. The winding extends beyond point 35 for a three-quarter turn which terminates substantially at point 36, and then continues in a manner substantially parallel to a portion 27 out to form a coil-group terminal designated by numeral 37. Like coil 20, the coil 30 is rectangular in form and for purposes of comparison with coil 20, may be said to have a major axis $xx'$ parallel to axis Y'Y and a minor axis $yy'$ parallel to axis $XX'$. The turns of the coil 30 may be said to be formed about an axis $zz'$ which is parallel to the axis $ZZ'$ of coil 20.

It will be noted that when the coil group is in the form shown in Fig. 5 the first two turns of coil 30 will be substantially in the same plane as the last two and one-half turns of coil 20, and that the last two and three-quarter turns of coil 30 are located in a plane beyond the plane of coil 20. The next operation to be formed is to arrange the coils 20 and 30 in the same plane and to arrange the turns of the coil 30 in such a manner that these turns will traverse the coil axis $zz'$ in a manner opposite to the direction of traverse of the turns of coil 20 about the axis $ZZ'$.

In order to accomplish this result the coil 30 may be turned by placing a 90° bend in the connecting portion 27 whereupon the axis $xx'$ will be parallel with the axis $XX'$. Then the coil 30 is revolved 180° about the connecting portion 27, or about the top edge of coil 20 as an axis, until said coil 30 takes the position shown in Fig. 6. This latter movement of the coil 30 will place a twist 28 in the connecting portion 27. The coil 30 is now in substantially the same plane as the coil 20, with its axis $z'z$ (reading from left to right in Fig. 6) parallel to the axis $ZZ'$ of coil 20 and with its axis $y'y$ parallel with the axis $Y'Y$ of coil 20. It will be noted that the turns of coil 20 traverse the $ZZ'$ axis in the direction of from left to right as viewed in Fig. 6, while the turns of the coil 30 traverse the axis $z'z$ in the direction from right to left. It is apparent that when current passes through the coil group, that opposite electromagnet effects will be produced by adjacent coils. It will be noted moreover that the terminals 31 and 27 of the coil group extend in the opposite directions and are located in substantially the same plane. These arrangements of the terminals are desirable for making certain electrical connections as will appear hereinafter.

Where such a coil group as has been described is to be used to provide field windings for the dynamo-electric-machine, such as an electric motor, these coils are generally wrapped with insulation tape and then formed by any suitable means so as to conform with the inner cylindrical surface of the field frame of the dynamo or motor which is usually a cylindrical shell.

From the foregoing description it will be apparent that the present invention is particularly adapted for providing field coils for dynamo-electric-machines having a series parallel or divided series field circuit. Such construction is used particularly with starting motors for automobile engines. It has heretofore been the practice to form each field coil separately and then join together the adjacent ends, but where the machine is constructed in accordance with the present invention the joining of adjacent ends of a group of field coils is eliminated since the group is constructed of a continuous conducting wire. It can be readily appreciated that it would be impossible to obtain such a compactly constructed starting motor if it were not for the fact that no space is wasted where the terminals of a coil group are brought out from the exterior of the turns thereof. If the first turn of the coil were started on the interior of the coil, it would be necessary to bring the starting end of the coil from the inside of the coil. Now when the wire used in field coil construction is relatively large in cross-sectional area, it will be readily understood that considerable space would be necessary in order to provide for bringing the terminals of these coils out from the inside thereof. By reason of this additional space required, the external dimensions of the starting motor would be considerably greater than the corresponding dimensions of an electric machine constructed in accordance with the present invention.

The coil construction which has been described is particularly adapted for coils requiring but two flat spiral layers or rows of turns. Where three or more flat layers or rows of turns are required in each coil the construction illustrated in Figs. 7 to 10 inclusive is resorted to. One end 121 of a length of wire is held in a fixed position in any suitable manner, and the first turn terminating at 122, and the second turn, terminating at 123, are formed in the same manner as the first two turns of the coil shown in Figs. 1 to 6 inclusive, said turns terminating at 22 and 23 respectively.

Figure 7:
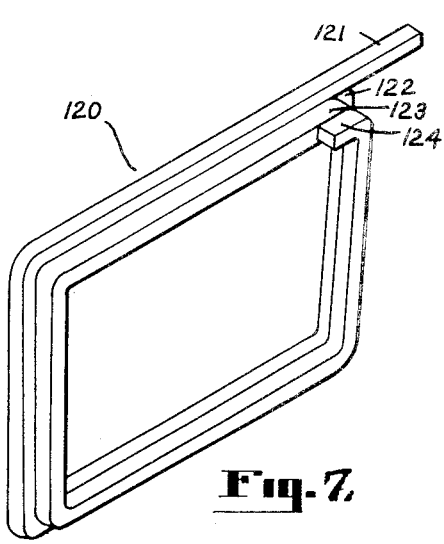
Figure 8:
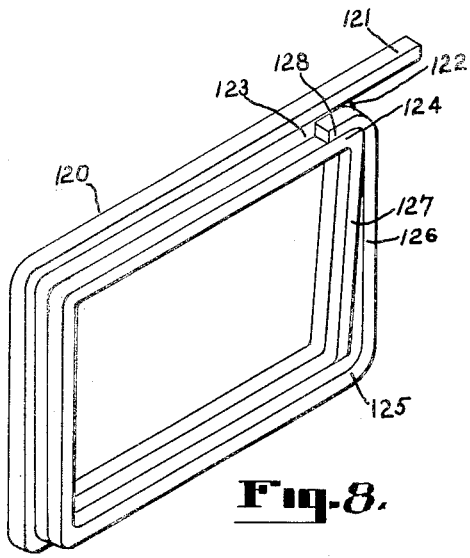

The third turn of this modified coil 120 begins at 123 of Fig. 7 and is wound in parallel relation with the second turn. This third turn terminates at 124.

The fourth turn of coil 120 begins at 124 and extends along the side edge of the third turn to the point 125 where three-quarters of the fourth turn is completed. The last quarter of the fourth turn indicated by numeral 126 is wound outside of the last quarter of the third turn indicated by numeral 127. The fourth turn terminates at 128 in Fig. 8.

Figure 9:
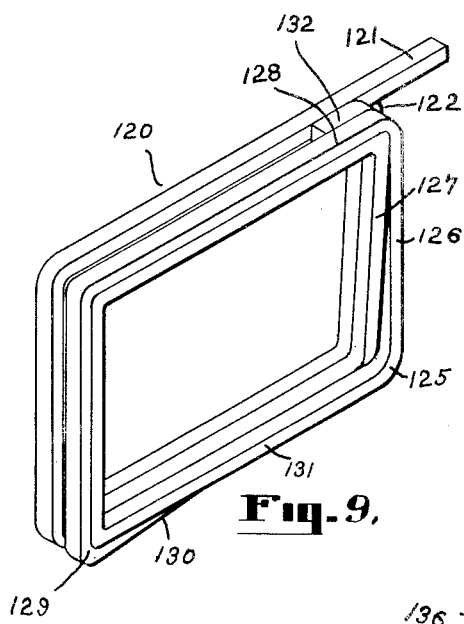

The fifth turn begins at 128 and extends around the outside of the fourth turn, and in parallel relation with the outside surface thereof down to the point 129 in Fig. 9 designating the terminus of one-half of the fifth turn. The third quarter of the fifth turn indicated by numeral 130 crosses over the third quarter of the fourth turn indicated by numeral 131 and then extends along the outside of the fourth quarter of the second turn and in parallel relation with the last quarter 126 of the fourth turn. The fifth turn terminates at a point designated by numeral 132 in Fig. 9.

The sixth turn begins at point 132 and extends around the outside of the first half of the second turn and in parallel relation with the first half of the fifth turn. The first half of the sixth turn terminates approximately at point 133 of Fig. 10, and then the third quarter of the sixth turn indicated by numeral 134 extends in the same plane as the first half of the sixth turn but on the outside of the third quarter 130 of the fifth turn. The sixth turn terminates approximately at a point designated by numeral 135 in Fig. 10.

Figure 10:
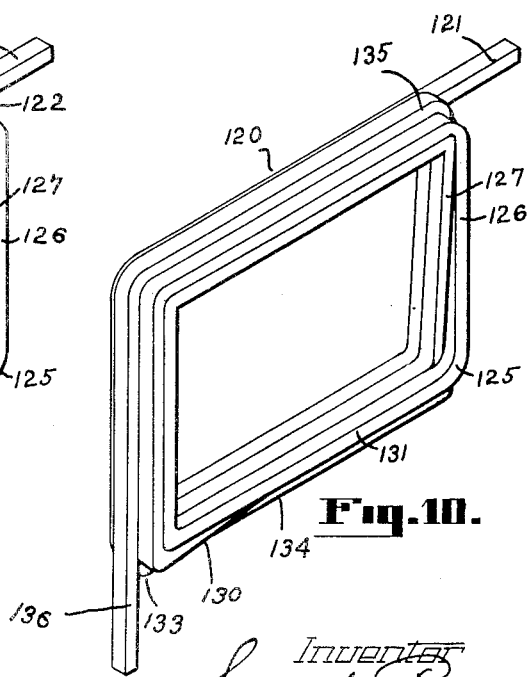

An additional half turn terminating at 136 in Fig. 10 may be wound if desired on the first half of the outside of the sixth turn.

When this coil 120 has been completed it may be placed in the position occupied by the coil 20 in Fig. 5, and a second coil of the coil group is wound from the continuous piece of wire continuing from the terminal 136 of the coil 120. This second coil will occupy a position relative to the coil 120 which bears the same relation as exists between the coils 30 and 20 in Fig. 5. Then one of these coils is twisted around with respect to the other and in the same manner as described in connection with the first form of the invention shown in Fig. 6.

This second form of the invention differs from the first form only in that there are three instead of two flat layers or rows of turns of wire. The characteristics of this modified form of the invention are the same as these of the first form in that the ends of coil group extend from the exterior of the coils, and the turns of adjacent coils traverse in opposite directions.

Where the requirements of the coils are such that the number of turns required necessitate a coil width equal to four or more times the width of the conducting wire or bars, or in other words where four or more flat layers or rows of turns are to be formed, the method described in connection with Figs. 7 to 10 inclusive is preferably employed. The first layer is wound from the exterior of the coil toward the interior to the required depth, then the winding continues around the coil axis and in parallel relation with the innermost turn of the first layer or row of turns. This parallel winding continues until the desired number of turns are applied to give the coil the required width. Then the winding continues from the exterior of the coil toward the exterior by applying additional turns upon the outside of the interior turns which have been previously formed. This winding may continue until a number of turns have been applied sufficient to give the coil of the required capacity having the required thickness as measured out from the axis of the coil.

Apart from the present invention, I do not claim as my own the method of winding or forming a single coil which consists in winding or forming spirally inwardly until the bottom turn is reached, and then in crossing over so as to wind an adjacent flat spiral layer beginning from the inside and winding or wrapping externally until an external turn is reached. Such a method is known to the art and may be practiced by the hands with the aid of bending pliers or by a specially constructed machine such as disclosed in the copending application of William L. O'Brien and Owen H. Spencer, Serial No. 344,121, filed December 11, 1919.

What I do claim as my invention is the method of forming such coils in groups from a continuous piece of relatively heavy wire so that the terminals of both coils will be continuous with the outside turns, the coils will be in the same plane and adjacent coils will be oppositely wound.

Also I claim as my invention the method of coil winding shown in Figs. 7 to 10 which differs from methods known to the art in that after forming internally with respect to outer turns until the innermost turn of the first spiral layer is reached, the winding may take place helically or parallel to the magnetic axis of the coil and any number of turns may be applied in successive layers until the outer layer is adjacent the first turn of the coil.

While the forms of products together with the process of manufacture herein shown and described constitute preferred forms of embodiments of the invention, it is to be understood that other forms might be adopted, all coming within the scope of the claims which follow.

What I claim is as follows:—

1. The method of forming coils in pairs from a continuous piece of wire which consists in forming the turns of the first coil spirally and approaching the axis of the spiral and then winding from the innermost turn of said spiral outwardly beginning with a turn adjacent to said innermost turn of the spiral so that the ends of said coil each will be continuous with and extend from outside turns of the coil; in forming the second coil in like manner, the first turn of the second coil being locatable in the same plane with the last outside turn of the first coil, and the axes of the coils being substantially parallel; and in bending and twisting the wire joining the two coils so that both coils lie with the first turn of the first coil in the same plane with the last turn of the second coil and with the last turn of the first coil in the same plane with the first turn of the second coil.

2. The method of forming coils in pairs from a continuous piece of wire which consists in forming the turns of the first coil spirally and approaching the axis of the spiral and then winding from the innermost turn of said spiral outwardly beginning with a turn adjacent to said innermost turn of the spiral so that the ends of said coil each will be continuous with and extend from outside turns of the coil; in forming the second coil in like manner, the first turn of the second coil being locatable in the same plane as the last outside turn of the first coil, and said coils extending, as regards thickness, in opposite directions with respect to said common plane; and in bending and twisting the wire joining the two coils so that both coils extend, as regards thickness, in the same direction from said common plane.

3. The method of forming coils in pairs from a continuous piece of wire which consists in forming the turns of the first coil spirally and approaching the axis of the spiral and then winding from the innermost turn of said spiral outwardly beginning with a turn adjacent to said innermost turn of the spiral so that the ends of said coil each are continuous with and extend from the outside turns of the coils; in forming the second coil in like manner, the first turn of the second coil continuing from the end of the last turn of the first coil; and then in turning one coil with respect to the other so that the turns traverse their respective coil axes in opposite directions.

4. The method of forming coils in pairs from a continuous piece of wire of rectangular section which consists in forming the turns of the first coil spirally and approaching the axis of the spiral and then winding from the innermost turn of said spiral outwardly beginning with a turn adjacent to said innermost turn of the spiral so that the ends of said coil each are continuous with and extend from the outside turns of the coils; in forming the second coil in like manner, the first turn of the second coil continuing from the end of the last turn of the first coil; in bending the wire joining the two coils 90° along a bending axis parallel to the axes of the coils; and then in twisting said wire 180° to bring said coils side by side.

5. The method of forming coils oblong in form and in pairs from a continuous piece of wire which consists in forming the turns of the first coil spirally and approaching the axis of the spiral and then winding from the innermost turn of said spiral outwardly beginning with a turn adjacent to said innermost turn of the spiral so that the ends of said coil each are continuous with and extend from the outside turns of the coils; in forming the second coil in like manner, the first turn of the second coil continuing from the end of the last turn of the first coil, said second coil having its longer side parallel with the shorter side of the first coil; in bending the wire joining the coils 90° to bring the longer sides of the coils parallel; and then in twisting said connecting wire 180° to bring the coils side by side.

6. The method of forming coils oblong in form and in pairs from a continuous piece of wire rectangular in section which consists in forming the turns of the first coil spirally and approaching the axis of the spiral and then winding from the innermost turn of said spiral outwardly beginning with a turn adjacent to said innermost turn of the spiral so that the ends of said coil each are continuous with and extend from the outside turns of the coils; in forming the second coil in like manner, the first turn of the second coil continuing from the end of the last turn of the first coil, said second coil having its longer side parallel with the shorter side of the first coil; in bending the wire joining the two coils 90° along a bending axis parallel to the axes of the coil to bring the longer sides of the coils parallel; and then in twisting said connecting wire 180° to bring the coils side by side.

7. The method of forming oblong shaped coils in pairs from a continuous piece of wire which consists in forming the turns of the first coil spirally and approaching the axis of the spiral and then winding from the innermost turn of said spiral outwardly beginning with a turn adjacent to said innermost turn of the spiral so that the ends of said coil each are continuous with and extend from the outside turns of the coils; in forming the second coil in like manner, the first turn of the second coil continuing from the end of the last turn of the first coil which consists in forming the turns of the first coil spirally and in oblong shape and approaching the axis of the spiral and then winding from the innermost turn of said spiral outwardly in oblong shape beginning with a turn adjacent to said innermost turn of the spiral so that the ends of said coil each will be continuous with and extend from outside turns of the coil; and forming a second coil beginning with a portion of the wire extending from the last formed turn of the first coil, and in forming in oblong shape and in manner similar to forming the first coil, but with the long side of the second coil parallel to the short side of the first coil, and the first turn of the second coil being locatable in the same plane as the last outside turn of the first coil, and said coils extending, as regards thickness, in opposite directions with respect to said common plane; in bending said connecting wire 90° to bring the long sides of the coils parallel; and in twisting the connecting wire 180° to bring the coils side by side with the short sides of the coils in alignment.

8. A pair of coils formed from a single piece of wire with the ends of the coil pair extending from outside turns, and the wire joining the two coils continuing from an outside turn of one coil over to the first outside turn of the other coil, each coil being wound deeper than the depth of one turn.

9. A pair of coils formed from a single piece of wire with the ends of the coil pair extending from outside turns, and the wire joining the two coils continuing from an outside turn of one coil over to the first outside turn of the other coil, each coil being wound deeper than the depth of one turn and the turns of the coils traversing their respective coil axes in opposite directions.

10. A pair of oblong shaped coils formed from a single piece of wire with the equal sides of the coils parallel, with the ends of the coil pair extending from outside turns, and with the wire joining the two coils continuing from an outside turn of one coil over to the first outside turn of the other coil, and each coil being wound deeper than the depth of one turn and the turns of the coils traversing their respective coil axes in opposite directions.

11. The method of forming a coil having its terminals extending from the exterior thereof; and which consists in winding a flat spiral layer in a plane substantially perpendicular to the coil axis, said winding taking place from the outside toward the inside of said layer; then in winding additional turns about the coil's axis, each succeeding turn being substantially parallel with the preceding turn and having substantially the same dimensions as the innermost turn of the flat spiral, this winding continuing along the coil axis to a distance requisite for a coil of the required capacity; and then in applying additional turns upon the outside of these interior turns which have been formed adjacent the flat spiral formation, this winding continuing until the coils of the required dimension and capacity has been formed, with both terminals of the coil extending from the exterior thereof.

In testimony whereof I affix my signature.

SAMUEL ROGERS.

Witnesses:
F. J. HARDMAN,
O. D. MOWRY.